(12) United States Patent
Hand et al.

(10) Patent No.: US 6,229,447 B1
(45) Date of Patent: May 8, 2001

(54) INDICATOR ASSEMBLY FOR A PRESSURIZED GAS LINE

(76) Inventors: C. Gene Hand, 5159 Solar Heights, Eugene, OR (US) 97405; Paul M. Redhead, P.O. Box 1483, Eugene, OR (US) 97440

( * ) Notice: Subject to any disclaimer, the term of this patent is extended or adjusted under 35 U.S.C. 154(b) by 0 days.

(21) Appl. No.: 09/501,536

(22) Filed: Feb. 9, 2000

(51) Int. Cl.[7] .................................................. G08B 21/00
(52) U.S. Cl. ...................... 340/614; 340/611; 340/626; 340/691.1; 116/67 R; 116/200; 116/227; 137/551; 137/557
(58) Field of Search ..................................... 340/614, 626, 340/603, 611, 608, 610, 691.1, 691.6, 692, 691.3; 116/67 R, 200, 227; 137/551, 557

(56) References Cited

U.S. PATENT DOCUMENTS

| | | | |
|---|---|---|---|
| 3,782,168 | * 1/1974 | Wailes | 73/1 R |
| 4,025,235 | * 5/1977 | Newbrough | 417/54 |
| 4,051,920 | * 10/1977 | Reinsma | 184/1 R |
| 4,064,855 | * 12/1977 | Johnson | 123/139 |
| 4,121,615 | 10/1978 | Bergeron | 137/555 |
| 4,450,721 | 5/1984 | Gaunt et al. | 73/290 B |
| 4,596,980 | 6/1986 | Bergeron | 340/626 |
| 5,281,100 | * 1/1994 | Diederich | 417/18 |

* cited by examiner

Primary Examiner—Nina Tong
(74) Attorney, Agent, or Firm—James D. Givnan, Jr.

(57) ABSTRACT

An indicator assembly includes a conduit segment located in place along a gas supply line served by a pressurized tank. A pressure actuated switch of the assembly closes upon sensing gas pressure in the conduit segment to close a circuit including a battery and an indicator to signal a user that the supply line is pressurized which can occur when proper shut down procedure is not accomplished or a faulty control valve. A bleed valve on the conduit segment permits venting of a pressurized gas line. A check valve of the assembly prevents erroneous activation of the indicator by residual gas trapped in the supply line after shut down.

4 Claims, 1 Drawing Sheet

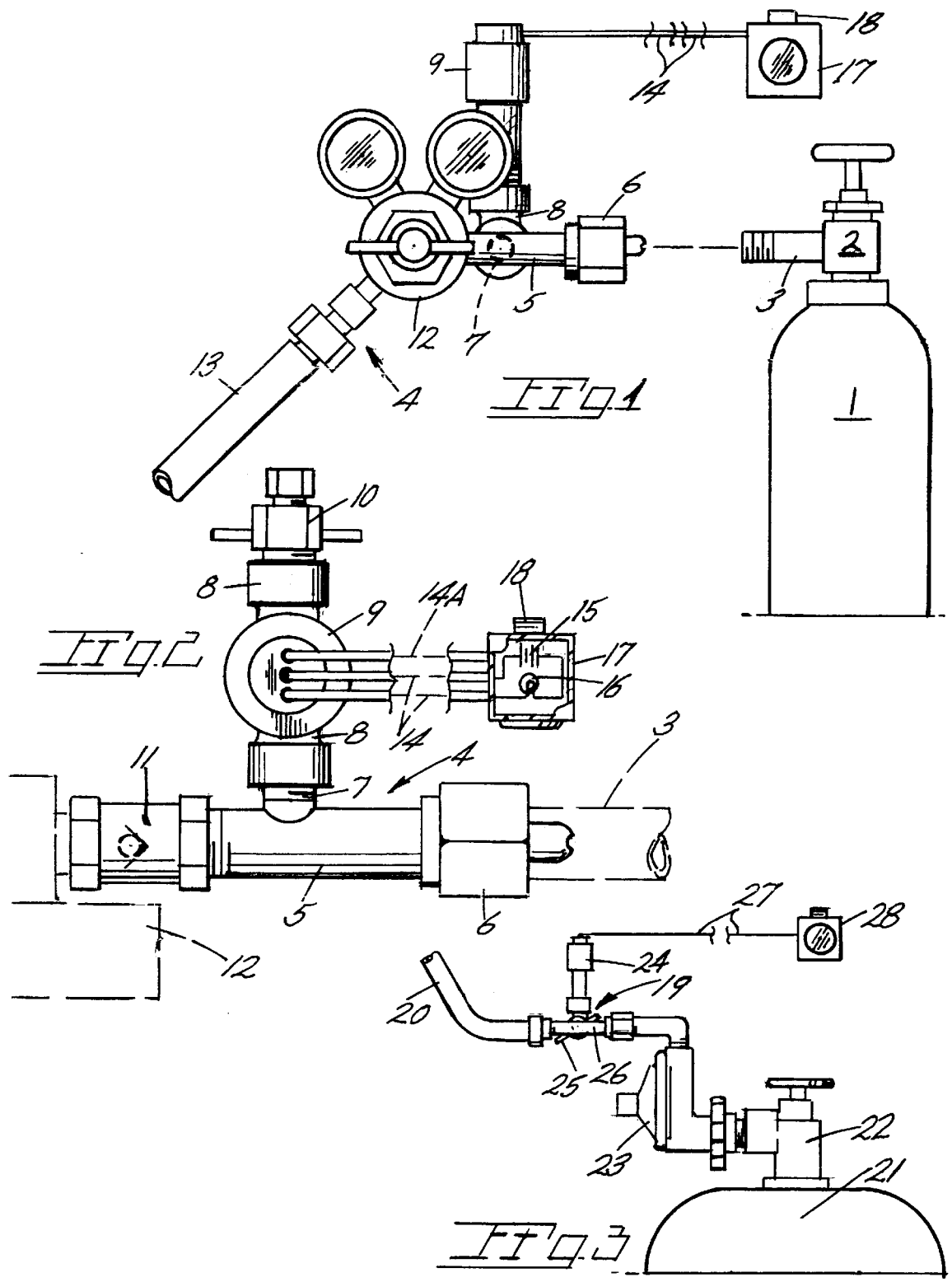

INDICATOR ASSEMBLY FOR A PRESSURIZED GAS LINE

BACKGROUND OF THE INVENTION

The present invention concerns generally the provision of an indicator assembly serving to signal the presence of pressurized gas in a gas supply line serving a using instrumentality.

A problem encountered by those using pressurized gas from a tank is the failure to shut off the gas supply and depressurize the supply line or conduit between the source and the using instrumentality, for example, a welding torch or a propane burner. In the interest of safety and economy it is of course always desirable to shut off a gas flow at the tank, a practice not always followed by gas users. While shutting off and depressurizing a gas supply line upon termination of a welding or other gas using operation is desirable, such may be overlooked with the result that line remains pressurized subjecting same to possible leaking. While pressure regulators in supply lines indicate line and/or tank pressure inspection of same at the end of a task is not always done. Still further, a malfunctioning control valve on an oxygen or propane tank could pressurize a non-operating gas supply line.

U.S. Pat. No. 4,121,615 discloses a mechanical indicator indicating loss of pilot gas pressure with provision for closing off communication between a fluid source and a remote actuator or valve. The valve control disclosed is operable by pilot presence and includes manual resetting of a valve stem to re-establish a primary gas flow.

U.S. Pat. No. 4,450,721 provides a method and an apparatus for indicating the weight and quantity of fuel in a storage container.

U.S. Pat. No. 4,596,980 discloses a valve having a stem responsive to pilot gas pressure and which stem, in the absence of pilot pressure, moves downwardly to permit a battery to energize an LED to indicate pilot pressure loss.

SUMMARY OF THE PRESENT INVENTION

The present invention is embodied in an indicator assembly for installation in a gas supply line to provide a signal as to the pressurized status of the supply conduit or line.

In the present indicator assembly a gas conduit segment is provided adjacent a pressurized gas tank or cylinder. The conduit segment is in communication with a pressure actuated switch which closes a circuit upon sensing system gas pressure to activate indicator means. The indicator means serves to inform a user of pressurized gas that perhaps a tank control valve has not been closed or is malfunctioning. The present indicator assembly includes a bleed valve to de-pressurize the gas supply at the termination of an operation. A check valve of the present indicator assembly prevents downstream residual gas from later re-pressurizing the indicator assembly providing an erroneous indication that the tank source is still serving the system.

Important objectives of the present invention include the provision of a conduit segment in a supply line or conduit having a pressure responsive switch which completes a circuit to indicator means in the presence of a set point pressure existing in the line; the provision of an indicator assembly for use with a pressurized gas source to provide a signal that the gas supply line from the source is still pressurized even though the welding or burner operation has been terminated to serve as a reminder to an operator to close a tank valve or pressurized gas from another source; the provision of an indicator assembly which signals, in one embodiment, that undesired residual gas pressure exists in a gas supply line or conduit subsequent to operation of a gas using appliance such as a welding torch or a propane burner.

BRIEF DESCRIPTION OF THE DRAWINGS

In the drawing:

FIG. 1 is a front elevational view of the present indicator assembly in place in a gas supply line served by a pressurized tank;

FIG. 2 is a plan view of the indicator assembly of FIG. 1 shown on a larger scale; and FIG. 3 is an elevational view of a modified indicator assembly in place on a gas supply line served by a propane tan and pressure regulator.

DETAILED DESCRIPTION OF THE PREFERRED EMBODIMENTS

With continuing attention to the drawings, the applied reference numeral 1 indicates a pressurized tank which may contain oxygen for release through a control valve 2 to a gas outlet at 3 and to a gas supply line or conduit generally indicated at 4.

A conduit segment is shown as a tee at 5 of the present indicator assembly is provided with a coupling 6 for effecting a gas tight connection to outlet 3. Conduit segment 5 has a threaded segment 7 which receives a tee at 8 on which a pressure actuated switch at 9 is mounted Additionally carried by tee 8 is a bleed valve at 10. With attention again to conduit segment 5, a check valve at 11 in the preferred form of the invention serves to block upstream gas flow from a gas pressure regulator 12. Check valve 11 prevents pressurization of conduit segment 5 from the expansion of trapped residual gas in a hose 13 serving a gas using instrumentality or appliance, e.g., a welding torch, propane burner, etc.

Pressure actuated switch 9 is preferably of the type having an adjustable set point to close an internal switch to complete a circuit with leads 14 from an electrical source 15 to indicator means 16 which is a signaling device such as a light, a horn, a second circuit including an audible alarm or other signaling device. Accordingly indicator means 16, when illuminated, indicates that the source of pressurized gas has not been closed. In those instances where the indicator means has been actuated the user will subsequently close off the source with release of gas pressure from conduit segment 4 by opening of bleed valve 10. Subsequent actuation of pressure actuated switch 8 would indicate a faulty tank control valve 2. A ground is indicated at 14A.

One suitable pressure actuated switch is a product of Omega Engineering, Inc. of Stamford, Conn., further identified as being of the PSW-500 series, model PSW-532. It will be understood that pressure actuated switch selection will be affected by various factors including system pressures.

An indicator housing at 17 may be provided with a clip 18 for attachment to conduit segment 5.

With attention to FIG. 3 of the drawings showing a modified form of the invention particularly suited for use with gas fired home barbecues, the indicator assembly, generally at 19, is modified by dispensing with earlier described ball check valve 11 as the grill mounted on-off valve (not shown) of the barbecue permits venting of gas supply line 20. In the modified form of the invention in FIG. 3 a pressurized tank is at 21 fitted with an on-off valve 22 on which a fixed pressure regulator 23 is mounted. A pressure actuated switch is at 24 while a bleed valve is at 25 in place on a conduit segment 26. Electrical leads 27 serve an indicator housing 28 equipped with a spring clip as at 18 in FIG. 2 for attachment to conduit segment 26.

While we have shown but one embodiment of the invention, it will be apparent to those skilled in the art that the invention may be embodied still otherwise without departing from the spit and scope of the invention.

We claim:

1. An indicator assembly for installation in a gas supply line served by a tank and actuated by gas pressure in the supply line, said assembly comprising, a conduit segment through which a gas flows, a switch in place on said conduit segment and actuated by residual gas pressure in said conduit segment, a circuit including said switch closed upon gas pressure in said conduit reaching a predetermined pressure set point and indicator means actuated upon closure of said switch, and a manually actuated normally closed bleed valve on said conduit segment operaable when opened to vent residual gas pressure from said conduit segment subsequent to termination of a gas flow from the tank.

2. The indicator assembly claimed in claim 1 additionally including a check valve in said conduit segment downstream from said switch and preventing pressurizing of the conduit segment by gas trapped in a portion of the gas supply line.

3. In combination, a portable tank containing a pressurized gas, a gas burning instrumentality, a supply line communicating said tank with said instrumentality, a gas pressure regulator in said supply line, a conduit segment in said supply line, a switch in place on said conduit segment and actuated by gas pressure in said supply line, a circuit including said switch and closed upon pressure in said conduit segment reaching a predetermined pressure set point and indicator means actuated upon closure of said switch, and a manually actuated normally closed bleed valve on said conduit segment operable when open to vent gas from said conduit segment subsequent to termination of gas flow from the tank, and a check valve in said conduit segment downstream from said switch and preventing pressurization of the conduit segment and actuation of said switch by gas trapped in a portion of the gas supply line.

4. In combination, a portable tank containing a pressurized gas, a gas burning instrumentality, a supply line communicating said tank with said instrumentality, a gas pressure regulator in said supply line, a conduit segment in said supply line, a switch in place on said conduit segment and actuated by gas pressure in said supply line, a circuit including said switch and closed upon pressure in said conduit segment reaching a predetermined pressure set point and indicator means actuated upon closure of said switch, and a manually actuated normally closed bleed valve on said conduit segment operable when open to vent gas from said conduit segment subsequent to termination of gas flow from the tank.

* * * * *